US008560665B2

(12) United States Patent
Parsons et al.

(10) Patent No.: US 8,560,665 B2
(45) Date of Patent: *Oct. 15, 2013

(54) METHOD FOR CREATING AN INTERNET BUSINESS

(71) Applicant: Go Daddy Operating Company, LLC, Scottsdale, AZ (US)

(72) Inventors: Robert R. Parsons, Scottsdale, AZ (US); Michael Wayne Crosby, Scottsdale, AZ (US); Steven Sachs, Scottsdale, AZ (US); Nima Kelly, Scottsdale, AZ (US); Jeff Carradus, Scottsdale, AZ (US)

(73) Assignee: Go Daddy Operation Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,057

(22) Filed: Dec. 10, 2012

(65) Prior Publication Data
US 2013/0103803 A1 Apr. 25, 2013

Related U.S. Application Data

(63) Continuation of application No. 10/811,677, filed on Mar. 29, 2004, now Pat. No. 8,356,090.

(51) Int. Cl.
*G06F 15/173* (2006.01)

(52) U.S. Cl.
USPC ............ 709/223; 709/202; 709/217; 709/245

(58) Field of Classification Search
USPC ................ 709/203–205, 223–224, 245–246, 709/217–219
See application file for complete search history.

(56) References Cited

U.S. PATENT DOCUMENTS

| | | | |
|---|---|---|---|
| 5,905,862 A | 5/1999 | Hoekstra | |
| 5,983,351 A | 11/1999 | Glogau | |
| 6,263,352 B1 | 7/2001 | Cohen | |
| 6,298,341 B1 | 10/2001 | Mann et al. | |
| 6,421,675 B1 | 7/2002 | Ryan et al. | |
| 6,519,589 B2 | 2/2003 | Mann et al. | |
| 6,560,634 B1 | 5/2003 | Broadhurst | |
| 6,745,248 B1 | 6/2004 | Gardos et al. | |

(Continued)

OTHER PUBLICATIONS

GoDaddy.com screen shot, http://web.archive.org/web/20030401091726/www.godaddy.com/gdshop/default.asp?e=com.

(Continued)

*Primary Examiner* — Bharat N Barot
(74) *Attorney, Agent, or Firm* — Stewart J. Womack

(57) ABSTRACT

The present invention provides a method for an Entrepreneur to start an Internet business by creating an Entrepreneur's web site using tools provided at a Facilitator's web site. The method allows the Entrepreneur to access the Facilitator's web site, register a desired available domain name, trademark the domain name, design an Entrepreneur's web site accessible via the domain name, design a similar appearing store front web site to handle commercial transactions, copyright the Entrepreneur's web site, offer hosting services for the Entrepreneur's web site and submit the Entrepreneur's web site to one or more search engines. Tremendous synergies may be achieved and serious pitfalls avoided in creating the Internet business by receiving overall guidance and assistance from one web site, i.e. a Facilitator's web site, in performing these processes.

17 Claims, 6 Drawing Sheets

(56) References Cited

U.S. PATENT DOCUMENTS

| | | | |
|---|---|---|---|
| 6,789,103 B1 | 9/2004 | Kim et al. | |
| 6,880,007 B1 | 4/2005 | Gardos et al. | |
| 6,895,430 B1 | 5/2005 | Schneider | |
| 7,219,327 B1 | 5/2007 | Jacobs et al. | |
| 7,983,924 B2 | 7/2011 | Garrison | |
| 8,037,168 B2* | 10/2011 | Schneider | 709/224 |
| 8,356,090 B2* | 1/2013 | Parsons et al. | 709/223 |
| 2002/0035611 A1 | 3/2002 | Dooley | |
| 2002/0042719 A1 | 4/2002 | Chauchard et al. | |
| 2002/0065903 A1 | 5/2002 | Fellman | |
| 2002/0091827 A1 | 7/2002 | King et al. | |
| 2002/0129013 A1 | 9/2002 | Thomas | |
| 2002/0156700 A1 | 10/2002 | Gray et al. | |
| 2003/0172145 A1* | 9/2003 | Nguyen | 709/223 |
| 2004/0044791 A1 | 3/2004 | Pouzzner | |
| 2004/0059793 A1* | 3/2004 | Gruber et al. | 709/217 |
| 2004/0068460 A1 | 4/2004 | Feeley et al. | |
| 2004/0167982 A1 | 8/2004 | Cohen et al. | |
| 2004/0172463 A1 | 9/2004 | King et al. | |
| 2004/0199620 A1* | 10/2004 | Ruiz et al. | 709/223 |
| 2005/0102354 A1 | 5/2005 | Hollenbeck et al. | |
| 2005/0273344 A1 | 12/2005 | Lee et al. | |

OTHER PUBLICATIONS

Sep. 1, 2011 office action in related U.S. Appl. No. 10/811,678.
Nov. 15, 2011 response to Sep. 1, 2011 office action in related U.S. Appl. No. 10/811,678.
Aug. 5, 2011 office action in related U.S. Appl. No. 10/811,615.
Aug. 26, 2011 office action in related U.S. Appl. No. 11/626,744.
Nov. 16, 2011 response to Aug. 26, 2011 office action in related U.S. Appl. No. 11/626,744.
Oct. 11, 2011 response to Aug. 5, 2011 office action in related U.S. Appl. No. 10/811,615.
Go Daddy Software, Oct. 2, 2002, www.archive.org, at http://web.archive.org/web/20021002232511/www.godaddy.com/gdshop/default.asp?e=com.
Go Daddy Software: WebSite Complete v 5.0, Dec. 10, 2002, www.archive.org, at http://web.archive.org/web/20021210150241/www.godaddy.com/gdshop/websitecomplete.asp?isc=&se=+&from_app=.
Copyright.gov; www.copyright.gov; Feb. 5, 2001.
www.GoDaddy.com screen shot, Dec. 6, 2002.
Sep. 28, 2012 Notice of Allowance in related U.S. Appl. No. 10/811,677.

* cited by examiner

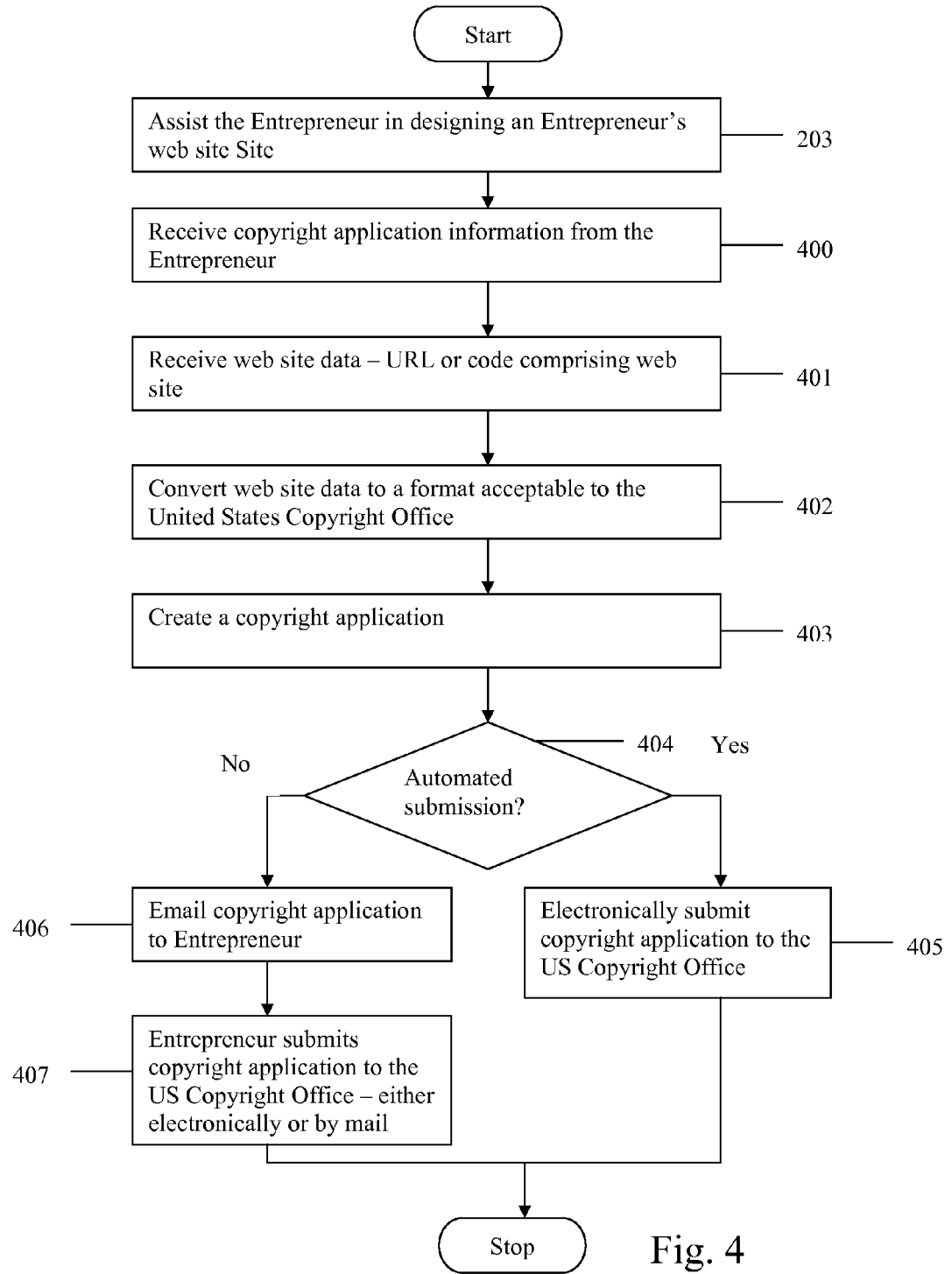

METHOD FOR CREATING AN INTERNET BUSINESS

CROSS REFERENCE TO RELATED PATENT APPLICATIONS

This patent application is a continuation of U.S. patent application Ser. No. 10/811,677, "METHOD FOR A FACILITATOR TO ASSIST AN ENTREPRENEUR IN CREATING AN INTERNET BUSINESS", also assigned to Go Daddy Operating Company, LLC.

FIELD OF THE INVENTION

The present invention relates to methods for assisting an Entrepreneur in starting an Internet business, and more specifically, to registering a domain name suitable for the Entrepreneur's business, trademarking the domain name, designing a web site accessible via the domain name over the Internet, integrating an electrical commerce function with the web site, copyrighting at least a portion of the content of the web site, hosting the web site with sufficient resources to handle the Entrepreneur's anticipated business requirements and marketing the web site.

BACKGROUND OF THE INVENTION

The Internet is a global network of interconnected computers that allows individuals and organizations around the world to communicate and to share information with one another. The World Wide Web (WWW), also known as the Web, is a collection of information resources contained in documents located on individual computers around the world and is one of the fastest growing parts of the Internet. Prevalent on the Web are multimedia web sites offering and selling goods and services to individuals, i.e. Customers. A web site consists of at least one, and often many interconnected, web pages.

Entrepreneurs are rapidly creating web sites to take advantage of the growing number of Customers using the Internet and Customers willingness to purchase goods and services over the Web. Web sites created by Entrepreneurs may be reached by millions of Internet savvy Customers, thereby allowing Entrepreneurs to offer their products and services to a very large pool of potential Customers. The quality of the Entrepreneur's web site is vital to the success of the Entrepreneur's Internet businesses as the web site is the access point for Customers to purchase the Entrepreneur's goods and services.

Entrepreneurs trying to start an Internet business may include individuals starting a home Internet business, corporations designed specifically for operation on the Internet or even existing corporations that are taking advantage of the popularity of the Internet to increase their sales with new and existing Customers. As the popularity of the Internet continues to increase with Customers, the number of new Entrepreneurs chasing Internet using Customers will also increase.

The process for starting an Internet business has many important steps and many of these steps require some specific technical knowledge or legal expertise to effectively complete. Small Entrepreneurs, and even many larger Entrepreneurs, typically do not have sufficient resources or expertise in each area to complete all the steps in the most effective manner. A mistake or poor implementation in any one of the steps at the time of creation of an Internet business may severally limit its later effectiveness.

One of the first steps in creating an Internet business is to select an available domain name by which the Entrepreneur's web site may be reached. Each web site has a unique Internet Protocol (IP) address that comprises a 32 bit binary number, typically shown in dotted decimal notation, e.g. 192.145.68.112. However, IP addresses, even in dotted decimal notation, are difficult to remember and use by Customers. Browsers, such as Microsoft's Internet Explorer, solve this problem by receiving domain names from Customers and then working with the Domain Name System (DNS) (a distributed Internet directory service) to find the IP address for the desired web site.

An Entrepreneur may obtain a domain name by accessing and registering an available domain name through a Registrar. For example, the Entrepreneur may connect to the web site at www.GoDaddy.Com, owned and operated by The Go Daddy Group, Inc., and follow their online process for registering a domain name. Once the domain name has been registered, the Entrepreneur may point the domain name to their web site via the DNS, thereby providing Customers with an easy method of locating and accessing the Entrepreneur's web site.

Selecting a domain name poses several problems. The domain name is preferably easy to remember, easy to spell, complements the type of goods and services to be sold, and, of course, must be available. The domain name should also not be confusingly similar to an existing famous trademark or confusingly similar to a trademark covering goods or services similar to the goods or services sold on the Entrepreneur's web site. The sheer number of previously registered domain names and existing trademarks make the selection process of a domain name very difficult.

Over time, the registered domain name may acquire considerable name recognition, good will and value for the Entrepreneur. A loyal Customer base may be built-up by the Entrepreneur that repeatedly accesses the Entrepreneur's web site via the domain name. Maintaining control over the domain name, and preventing confusingly similar domain names from appearing on the Internet, will be important factors in the success of the Entrepreneur's Internet business.

The Entrepreneur may receive important legal rights by trademarking the domain name with the United States Patent and Trademark Office (USPTO). For example, a trademarked domain name may receive additional legal protection under the Internet Corporation for Assigned Names and Numbers' (ICANN) Uniform Domain Name Dispute Resolution Policy, the Lanham Act and the Anti-Cybersquating Piracy Act. Thus, trademarking the domain name gives the Entrepreneur substantial legal rights to prevent others from using confusingly similar domain names to the Entrepreneur's trademarked domain name.

Entrepreneurs regularly register domain names with a Registrar that incorporate their existing trademarks. This usually occurs when the Entrepreneur has an existing traditional business and is expanding the business by creating an Internet presence. However, for many Entrepreneurs, their domain names have not been trademarked and therefore are not as fully protected as federally registered trademarked domain names.

Entrepreneurs often fail to trademark their domain names. There are a host of reasons for this. Some Entrepreneurs mistakenly believe that by registering their domain name with a domain name Registrar, they are fully legally protected. Others are not aware of the many legal benefits of federally registering their domain names as trademarks. In addition, many Entrepreneurs are unfamiliar with the process for trademarking their domain names and they do not want to spend the time to learn the process or to pay an attorney to trademark their domain names for them. Applicants believe that many of these problems are the result of a lack of integration between the process for registering a domain name via a Registrar and the process for trademarking the domain name as a trademark with the USPTO.

Web sites are almost always created using Hyper Text Markup Language (HTML) to create a standard set of tags or commands that define how web pages within a web site will be displayed by a browser. Designing a web site in HTML, or any other computer language, is a very laborious task that requires a high level of expertise and a substantial amount of time and effort. Designing a custom web site require a great deal of creativity, planning and computer expertise.

There are various products and tools commercially available to assist Entrepreneurs in designing their web sites that allow even Entrepreneurs with limited computer abilities to design their own web sites. The easiest web site designing tools to use provide a plurality of templates that Entrepreneurs may select from. Once a template is chosen, the same template may be used for each web page in the web site. The Entrepreneurs may insert text or graphics into specific locations on the chosen template set aside for those features. Templates provide a uniform look and feel for each web page within a web site so that a Customer can tell that they are in the same web site as they move from web page to web page within the web site.

Entrepreneurs often want to display their products and services with corresponding prices on their web sites. The Entrepreneurs also typically want a method of collecting information such as a shipping address and payment information from their Customers. Programming these features into the Entrepreneurs web site, while certainly possible, requires a substantial amount of expertise and effort. Each Entrepreneur would have to duplicate this cumbersome task on their web site. To simplify the process, some third party web sites offer a shopping cart or store front web site feature. Entrepreneurs initialize or set-up the store front by transmitting information regarding their goods and services (possible with graphics showing the goods), payment options/information and some display preference options to the web site designed to create the store front web site. A selection of templates may be made available to the Entrepreneur to assist the Entrepreneur in creating a visually appealing method of displaying their goods and services.

In practice, a Customer would connect to the Entrepreneur's web site and then if interested in purchasing goods or services of the Entrepreneur, would select a hyperlink to a store front web site as previously set-up by the Entrepreneur. The store front web site allows the Customer to select and purchase goods and services and pay for them at which point the store front web site may transfer the payment to the Entrepreneur. The Customer may then be linked back to the Entrepreneur's web site after the completion or cancellation of the purchase.

Applicants have noticed that the templates used to design an Entrepreneur's web site do not match the templates for designing a store front web site. This prevents the Entrepreneur's web site and the store front web site from appearing as a single virtual web site to Customers, thereby possibly confusing the Customers about the source of the goods and services they are purchasing.

Another problem for web site designers is that their work, i.e. the creative aspects of their web site, may be easily copied by competitors. The web site code may be copied and pasted in mass to a competitor's web site or the competitor may copy and recreate the layout to their web site. The fact that web sites are created using computer code that is very easily copied makes web site's designs particularly vulnerable to being stolen.

The creation of a web site on the Internet automatically provides some limited legal rights to the owner of the web site in the United States. By inserting a copyright symbol, date and name of the owner of the web site on the web site, additional legal rights may be obtained. But for the Entrepreneur to receive the maximum legal protection for their web site, they need to register, i.e. copyright, their web site with the United States Copyright Office (USCO). Despite the legal advantages, only a very small percentage of web sites ever get registered with the USCO.

The reasons that Entrepreneurs fail to copyright their web sites with the USCO are as varied as the Entrepreneurs themselves, but the primary reasons tend to be similar to the reasons that Entrepreneurs fail to trademark their domain names. As examples, Entrepreneurs often do not appreciate the legal advantages of copyrighting their web site, they do not understand the procedures for copyrighting their web site and they do not want to pay an attorney to copyright their web sites for them. Applicants believe that because conventional web site development tools do not assist the Entrepreneurs in copyrighting their web site with the USCO, many Entrepreneurs fail to fully legally protect the material within their web site by copyrighting their web sites.

Entrepreneurs' web sites may be hosted on servers that permit Customers to access the web sites over the Internet. The amount of memory and bandwidth provided by the servers for use by the web sites are typically two of the largest factors in determining the cost of the hosting services. Entrepreneurs often incorrectly estimate the amount of hosting services required by their Internet businesses, resulting in paying more for hosting services than necessary or running their Internet business with insufficient resources.

In order to increase revenue, Entrepreneurs typically try to attract additional Customers to their web sites. However, with an ever increasing number of web sites on the Internet, Entrepreneurs are finding it increasingly difficult to attract new Customers to their Internet business. This trend is likely to continue as the number of businesses trying to gain a presence on the Internet significantly increases the competition for the attention of Internet Customers. The future success for many of these Internet businesses will depend on their ability to attract additional Customers to their web sites.

Web sites are predominantly found by Internet Customers through the use of a search engine or directory. Some of the more widely used search engines are, for example, AOL, Google, Yahoo, Excite and Dogpile. Customers are able to enter a search phrase comprised of one or more keywords or a phrase, typically a name of a good or service or a topic of interest, into a search engine. The search engine will display a list of web sites that the search engine has determined are related to the search phrase along with links to the web sites. The search engines invariably display the web sites in a particular order or rank. The web sites that the search engine has determined are of the highest quality or are the web sites with content most closely related to the search phrase of the Customer are displayed near the top, while lower quality web sites or those not as closely related to the search phrase are displayed lower on the list. The shear number of web sites currently on the Internet can often result in a list having multiple pages of web sites related to many common search phrases.

In an effort to increase traffic flow to their web sites, sophisticated Entrepreneurs register their web sites with one or more search engines. However, most Entrepreneurs are unfamiliar with the registration process, and even those that are familiar with the process often find it difficult and time consuming to register their web sites with a plurality of different search engines. Thus, many web sites do not receive as many Customers as they would if they were registered on a greater number of search engines.

Another common method to drive Customers to an Entrepreneur's web site is though targeted email campaigns. Many Entrepreneur web sites allow a Customer to create an account. During the account creation process, sites may allow a Customer to specify if the Customer would like to be notified of any future specials or sales. Targeted marketing campaigns may then be created from the customer accounts that help drive traffic to the Entrepreneur's web site. However, Applicants have noticed that these targeted marketing campaigns do not have a similar appearance with the Entrepreneur's Web site and thus confuse the Customer as to the source of the marketing information.

There are thus many advantageous steps that an Entrepreneur may take to protect their intellectual property and to enhance the commercial success of their Internet business. One of the main hurdles for the Entrepreneur is to complete all or as many of the steps as possible. Each step offers specific advantages while the failure to complete a step may have a detrimental effect on the eventual success of the Internet business.

There are many problems for an Entrepreneur to deal with in creating an Internet business. For example, many Entrepreneurs are not even going to be aware of all the above described beneficial steps, let alone the best order to complete the steps in. Even if they are aware of the steps, they may be unable to find the plurality of different web sites needed to complete the above recommended steps. Even after the web sites have been located, the process for completing the steps may be very complicated and often require special technical or legal knowledge. In the prior art, the Entrepreneurs had to locate all the web sites themselves and complete the desired steps without any overall guidance.

The challenge for Entrepreneurs is compounded by the fact that some of the web sites necessary to complete the above described steps are general in nature and not specifically created to assist Entrepreneurs in developing their Internet businesses. As examples, the web sites for the USPTO and the USCO have general purpose procedures since they must provide guidance to a wide variety of individuals using their services and are not able to provide specific instructions for users trademarking their domain names or copyrighting their web sites, respectively.

To further exasperate the problem for Entrepreneurs, the failure to complete any one or more steps previously outlined may have serious consequences for the Entrepreneurs' Internet business. As specific examples, the consequences may be that important intellectual property rights are not fully protected, the level of traffic to the Entrepreneur's web site may be restricted or the Entrepreneur's web site may be inadvertently contributing to identity theft. There needs to be a way for Entrepreneurs to easily and inexpensively solve these problems.

New systems and process are therefore needed to attract customers and increase traffic flow to Entrepreneurs' web sites that overcome the limitations of current methods. Thus, there remains a need for systems and processes which reduce or eliminate the problems associated with the conventional methods. Specifically, systems and processes are needed to assist Entrepreneurs in designing and protecting the intellectual property of their Internet businesses.

SUMMARY OF THE INVENTION

A Facilitator may create a web site to assist Entrepreneurs in starting an Internet business. The Facilitator's web site may provide guidance to Entrepreneurs regarding the entire Internet business creation process, such as describing the benefits for each step, the actions necessary to complete each step and providing a recommended order for completing the steps. In addition, the Facilitator's web site may provide the tools for Entrepreneurs to successfully complete the steps necessary to start the Internet business. Accomplishing multiple steps at a single web site solves many of the problems Entrepreneurs experience with prior art methods. By providing a plurality of powerful tools for creating an Internet business that are all integrated in a single web site takes away the burden from the Entrepreneur in having to locate all this tools on various web sites spread across the Internet.

Synergizes may be obtained by completing the steps in a logical order and by completing the steps within a shorter time-frame than with conventional methods. Specifically, by providing overall guidance to the Entrepreneur and by providing the tools necessary to create the Internet business all at one web site, there is a much greater chance that all of the steps will be successfully completed and in a much shorter time than compared with prior art methods.

Another advantage of the invention is that information gathered during an earlier step may be saved and then used in completing later steps. This greatly reduces the frustration for Entrepreneurs of reentering the same information over and over during the creation of their Internet business. This advantage may still occur even if the Entrepreneur completes the later steps months or even years later. Saving data and using it for later steps also reduces the chance of errors in the later used data.

Entrepreneurs may reach the Facilitator's web site via the Internet using, for example, their own computer systems. Once connected to the Facilitator's web site, the Entrepreneur may register an available domain name with the assistance of the Facilitator's web site. The Facilitator's web site may verify that the requested domain name is available and possibly even suggest alternative domain names. In a preferred embodiment, the Facilitator's web site is operated by a domain name Registrar or a Reseller of a Registrar. A Facilitator that is also a Registrar or a Reseller of a Registrar of domain names will have the necessary infrastructure in place to register available domain names for Entrepreneurs.

The Facilitator's web site may assist the Entrepreneur in designing an Entrepreneur's web site by providing web site design services. The web site design services may include software packages that are downloaded to the Entrepreneur's computer, but are preferably software packages run on the Facilitator's web site. The web site design services may provide templates for building web site pages or a drag and drop approach that allows custom web site pages to be created. Templates may offer various layouts for items such as navigational bars/menus, graphical images and textual content where their size, appearance and location may all be defined.

The Facilitator's web site may also offer an electronic commerce (shopping cart) feature as part of a store front web site integrated with the Entrepreneur's web site. The store front web site feature may be used to allow Customers to select and pay for goods and services of the Entrepreneur. By sharing a common template, the Facilitator's web site and the shopping cart web site may appear as one virtual web site to Customers, when in fact the Entrepreneur's web site and the store front web site may be two distinct web sites. In practice, a Customer would first access the Entrepreneur's web site and the Entrepreneur may then link to the store front web site where the Customer could select and purchase the goods and services offered by the Entrepreneur. Sharing a common appearance between the Entrepreneur's web site and the store front web site gives confidence to the Customer that they are buying the goods and services from the Entrepreneur and not from a third party hosting the store front web site. The Facilitator's web site may provide an integrated solution including providing a secure certificate, a merchant account and a payment gateway account. In a preferred embodiment, the Facilitator's web site will also support any of the Entrepreneurs' existing payment components listed above.

Once the Entrepreneur's web site has been created (it should be noted that edits, updates and changes will likely be made to the Entrepreneur's web site throughout its life), the Facilitator's web site may arrange hosting services for the Entrepreneur's web site. In a preferred embodiment of the invention, the Facilitator's web site assists the Entrepreneur in selecting hosting options appropriate for the anticipated business volume of the Entrepreneur's web site. The Facilitator may ask questions of the Entrepreneur to be able to calculate the likely Internet volume the web site is likely to receive and recommend a level of hosting services appropriate for the expected volume. As examples, the amount of disk space and bandwidth provided to the Entrepreneur's web site may be recommended to give the Entrepreneur's web site the resources it needs without incurring costs for services it does not need.

A common problem for Entrepreneurs involves protecting the intellectual property of the content of their web site. Compounding the problem is that web sites are extremely easy to copy and the ubiquitous, but incorrect, belief that anything on the Internet is in the public domain and may be copied. The Facilitator's web site may be used to assist the Entrepreneur in copyrighting all or some portion of the content of the Entrepreneur's web site with the USCO. This greatly enhances the legal rights of the Entrepreneur to the intellectual property of the contents of their web site.

Another common problem for Entrepreneurs involves protecting their registered domain names. Unscrupulous individuals may try to register confusingly similar domain names in a bad faith attempt to profit from confusion between the domain names and the good will generated by the Entrepreneur in their domain name. The Facilitator's web site may assist Entrepreneur in trademarking the Entrepreneur's domain name with the USPTO. In a preferred embodiment, the Entrepreneur's domain name is trademarked after the Entrepreneur's web site has been designed and hosted, i.e. after the trademark has been used in interstate commerce. While the domain name may be trademarked before being used in interstate commerce, waiting to trademark the domain name after commercial use allows for a simpler and less expensive application process to be used in trademarking the domain name. Specifically, a Use In Commerce application may be filed instead of an Intent To Use application, thereby avoiding the fee and the paper work associated with filing a Statement Of Use form that is only required for Intent To Use applications.

A typical objective for most Entrepreneurs is to get as many Customers as possible to visit their web site. After all, Entrepreneurs' web sites that are not accessed by Customers have little economic value. Using a domain name that is easy to remember and easy to spell helps, but Customers often use search engines to locate the web sites that they visit. The Facilitator's web site may be used to submit the Entrepreneur's web site (and even individual web pages) to one or more search engines to assist in increasing the number of Customers that access the Entrepreneur's web site. The Facilitator's web site may also recommend or even make changes to the Entrepreneur's web site to assist the Entrepreneur's web site's ability to be found by search engines.

To assist the Entrepreneur in submitting all of the products in their catalog to the various search engines, the Facilitator's web site may allow Entrepreneurs to send targeted marketing campaigns to the Entrepreneurs' customer bases. One form of targeted marketing is email campaigns. The Facilitator's web site may allow Entrepreneurs to compile a list of relevant Customers to send marketing information to. In a preferred embodiment, the marketing information would contain the same look and feel as the Entrepreneurs' web sites to instill confidence and increases the chances of a sale with the Customer.

Another objective of the invention is to create synergies by performing all or particular combinations of the steps outlined above at a Facilitator's web site. Of particular value is the subcombination of registering a domain name, hosting a web site using the domain name and trademarking the domain name. Another powerful subcombination is designing a web site and copyrighting the web site using tools found on the Facilitator's web site. Yet another powerful subcombination is designing an Entrepreneur web site and a store front web site where both have a similar appearance, preferably by using the same web site template.

Additional advantages and aspects of the present invention will become apparent in the following detailed description of the invention and the claims.

BRIEF DESCRIPTION OF THE DRAWINGS

FIG. 4 is a flow chart illustrating an embodiment of the invention for designing a web site and copyrighting the web site with the United States Copyright Office;

DETAILED DESCRIPTION OF THE PREFERRED EMBODIMENTS

Figure 1:
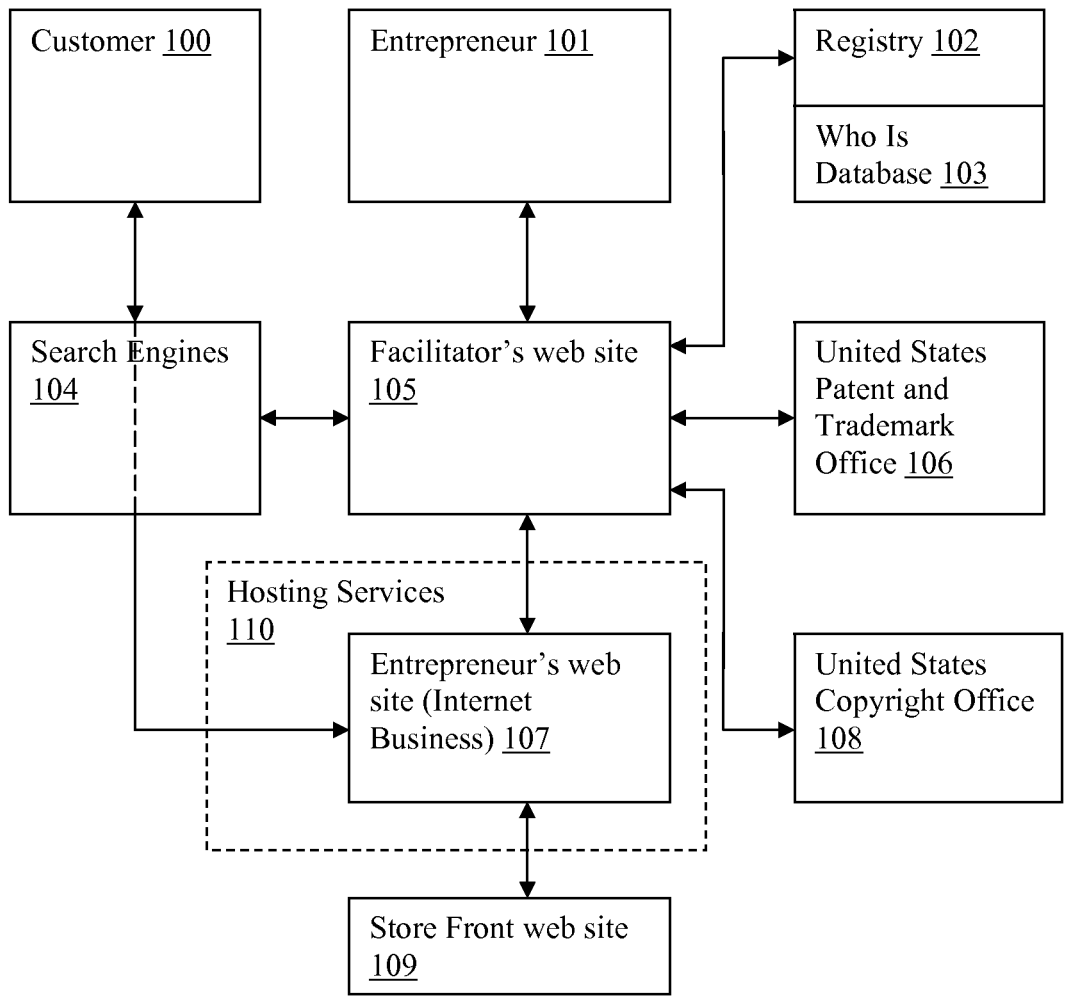
FIG. 1 is a diagram illustrating the relationship between various components for an embodiment of the invention.
Figure 2:
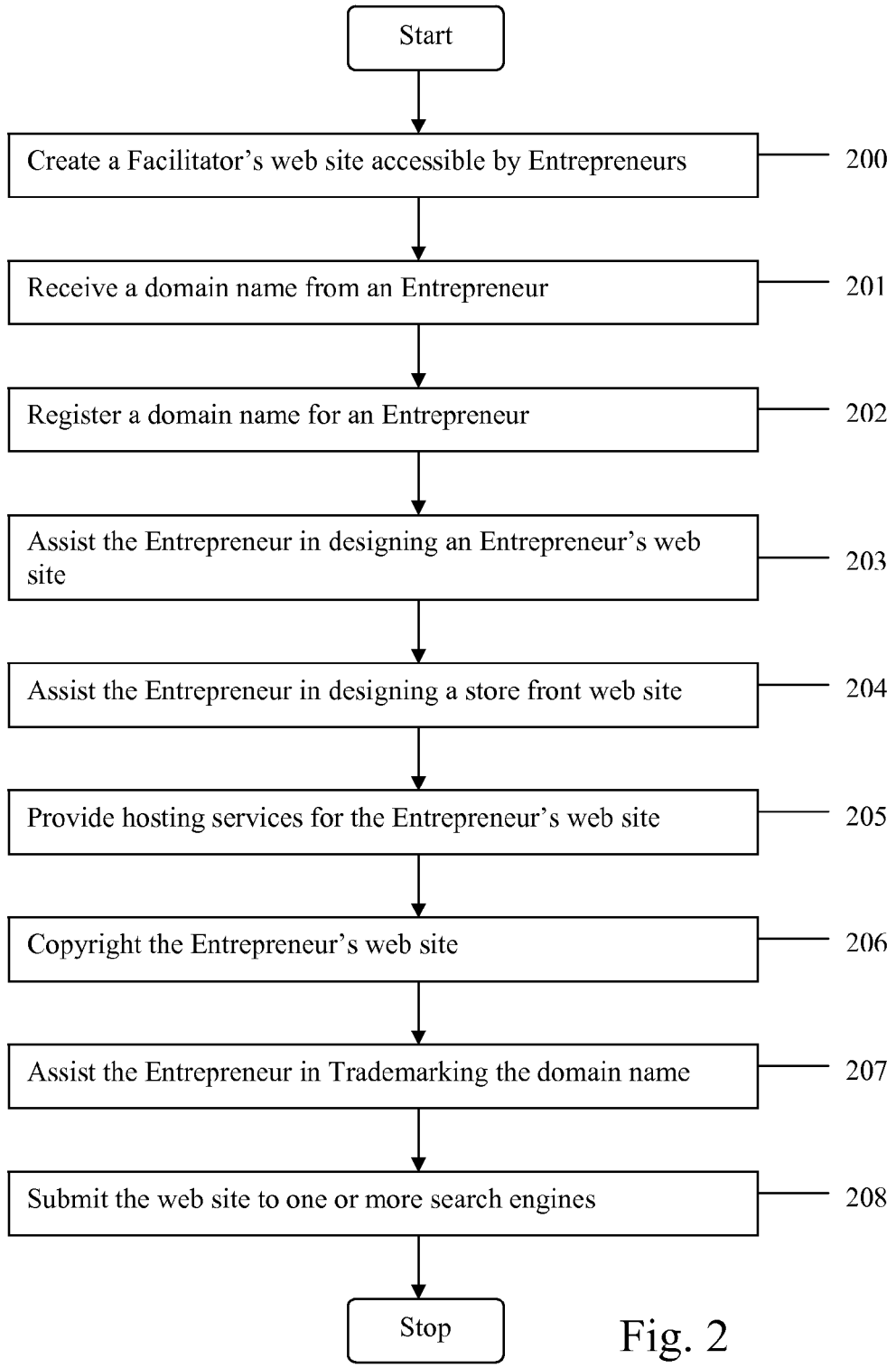
FIG. 2 is a flow chart illustrating an overall generic process for an embodiment of the invention.
Figure 3:
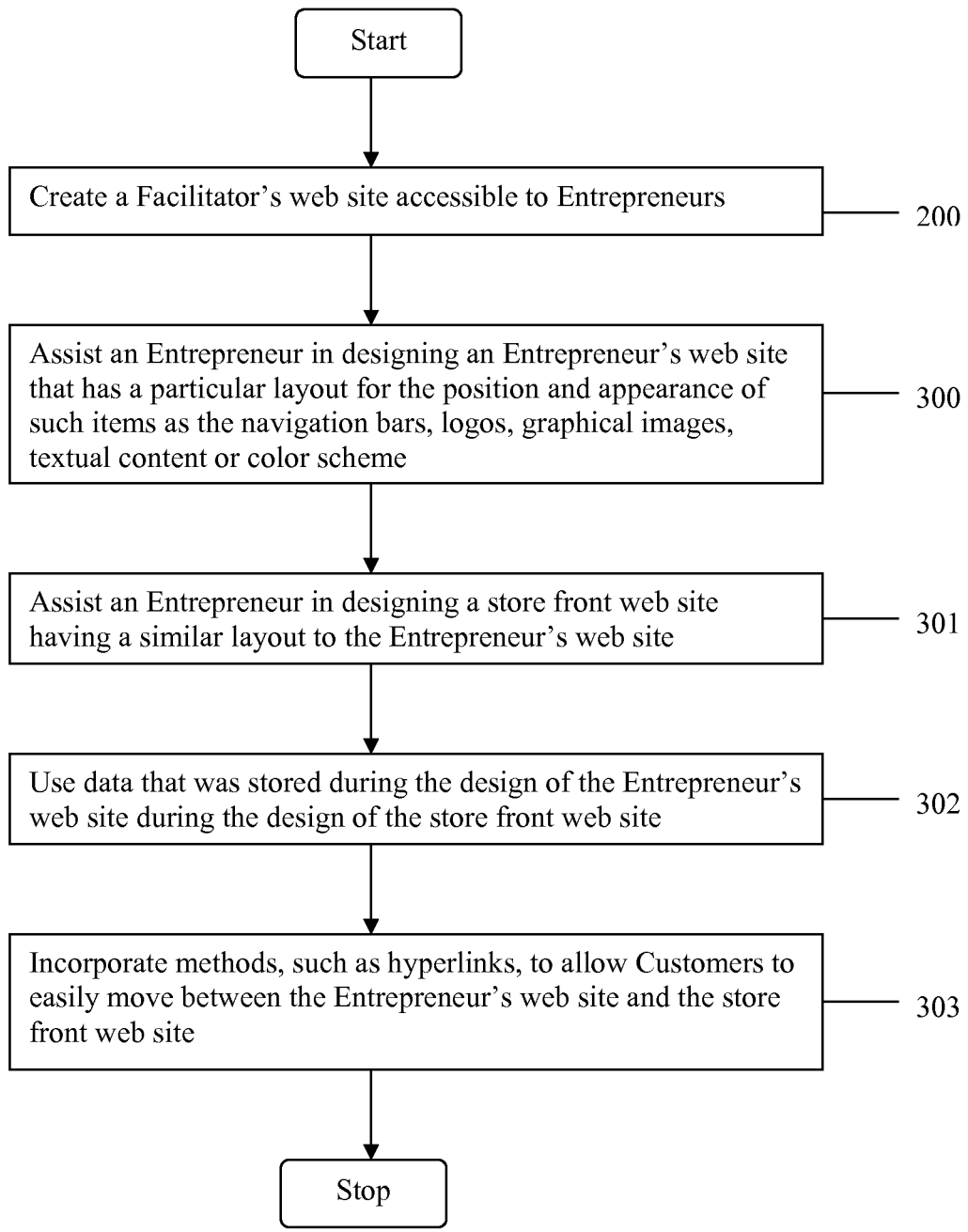
FIG. 3 is a flow chart illustrating an embodiment of the invention for designing a web site and a store front web site that share a substantially similar layout.

The present invention will now be discussed in detail with regard to the attached drawing figures which were briefly described above. In the following description, numerous specific details are set forth illustrating Applicants' best mode for practicing the invention and for enabling one of ordinary skill in the art to make and use the invention. It will be obvious, however, to one skilled in the art that the present invention may be practiced without many of these specific details. In other instances, well-known machines and process steps have not been described in particular detail in order to avoid unnecessarily obscuring the present invention. Unless otherwise indicated, like parts and processes are referred to with like reference numerals.

The general features used in practicing the invention and their interrelationships will be discussed with reference to FIG. 1. The invention includes various steps that may be performed by an Entrepreneur 101 at a Facilitator's web site 105 to create an Entrepreneur's web site 107 that acts as an Internet access point to the Entrepreneur's Internet business. The placement of a plurality of tools on a Facilitator's web site 105 necessary for creating an Internet business greatly assists the Entrepreneurs' 101 in completing more of the recommended steps and completing the steps in a much shorter time frame than with the ad hoc approach used by Entrepreneurs in the prior art.

The invention may be used by a wide variety of individuals and businesses, thus the term Entrepreneur as used to describe the present invention should be given a very broad meaning. As non-limiting examples, the term Entrepreneur may include an individual, a partnerships, a start-up businesses and an existing businesses looking to create an Internet presence.

The invention is not limited to any particular type of business, other than the business will conduct at least some part of its operation on a global computer network, such as the Internet. In preferred embodiments, the goods and services of the Entrepreneur 101 are described and sold to Customers 100 who access the Entrepreneur's web site 107. However, the Entrepreneur's web site 107 may be more limited and used only business activities such as public relations, new product announcements, marketing, consumer surveys or public service announcements.

Domain names have an associated Internet protocol addresses that is managed by the Domain Name System (DNS). The DNS is a distributed database that provides the protocol which allows Customers or other Internet users to locate various web sites on the Internet based on the web site's domain name. Web browsers are able to access the DNS to determine the Internet protocol address for a particular web site, thereby allowing web site browsers to locate the desired web site for the Customer. The DNS allows a web site to change its hosting service provider, and thus its Internet protocol address, but to keep its domain name with a new hosting service provider by simply updating the DNS with the web site's new Internet protocol address assigned to it by its new hosting service provider.

The DNS uses a hierarchical naming scheme whereby various labels are separated by a period, commonly referred to as a "dot", to form domain names. The characters on the far right side of the domain name are referred to as the Top-level Domain (TLD). Common TLDs include ".com" (commercial), ".net" (networking provider), ".org" (non-profit and miscellaneous organizations), ".us" (United States), ".info" (information resources), ".gov" (government) and ".edu" (educational). Many other TLDs exist and additional new ones are added to the DNS from time to time. An illustrative example of a domain name is "trademark.com" where "trademark" may be considered the label and ".com" is the TLD. The Entrepreneur 101 may find it desirable to trademark the label portion, the entire domain name or both. For this example, the Entrepreneur may wish to trademark "trademark", "trademark.com" or both.

The Internet is comprised of interconnected web sites that are accessed by Clients, such as Customers 100 and Entrepreneurs 101. Web sites are typically hosted by a web site hosting service and Clients are typically provided access to the Internet by an Internet Service Provider. A Client may move between web site pages within a web site or may "surf" the Internet by moving from one web site to another web site, typically with the assistance of a browser. Browsers offer several methods for Clients to move within the Internet, such as having a "Favorites" menu to select a particular URL and providing an Address line for manually typing in a desired URL. Both features allow Clients to quickly move between various web sites and their associated web pages on the Internet.

Hyperlinks are another powerful method for Clients to move around the Internet. A hyperlink includes text or a graphical image capable of moving a Client to a predetermined web page on the Internet with the click of a mouse. Hyperlinks may be created from menu items, graphical images, icons or text passages and when the hyperlink is selected the Client moves or "links" to another web page that may or may not be part of the currently accessed web site. Text hyperlinks are generally written in blue and underlined to let the Client know the text is a hyperlink. Hyperlinks are a powerful tool in creating web sites as they allow a web site designer to assist a Client in moving from web page to web page in a logical order. Hyperlinks may be used to move from web page to web page even when the web pages are not part of the same web site.

Various possible embodiments of the invention are illustrated in the flowcharts of FIGS. 2, 3a-c, 4 & 5 and the steps for these embodiments will now be discussed in greater detail. A Facilitator may offer one or more recommended services for Entrepreneurs 101 to start their own Internet businesses 107 on a Facilitator's web site 105. (Step 200) In a preferred embodiment, the Facilitator may be a Registry, Registrar or Reseller of domain names as this will allow the Facilitator to easily check on the availability of various domain names and to register available domain names for Entrepreneurs 101. The Facilitator may advantageously offer its service to Entrepreneurs 101 via its Facilitator's web site 105 on the Internet. Placing the Facilitator's web site 105 on the Internet allows for easy and convenient access by a large number of Entrepreneurs 101 and allows the Facilitator's web site 105 to have easy access to other web sites that are useful in creating the Entrepreneur's Internet business 107.

One of the advantages for the present invention over the prior art is that information regarding the Entrepreneur 101 only has to be collected once by the Facilitator's web site and then it may be stored and used in multiple steps of the invention. Information regarding the Entrepreneur 101 may be requested either directly from the Entrepreneur 101 or from one of the many available on-line databases. The information may include, for example, the Entrepreneur's contact information so that this information does not have to be reentered by the Entrepreneur over and over. The information may be verified by the Entrepreneur 101 and then stored in memory that is assessable by the Facilitator's web site 105. If the Entrepreneur 101 leaves the Facilitator's web site 105, the information regarding the Entrepreneur 101 may be stored in a medium, such has a hard disk drive, useful for long term storage of data. The stored data may then be used when the Entrepreneur 101 accesses the Facilitator's web site 105 at a later date.

Once connected to the Facilitator's web site 105, the Entrepreneur 101 may register an available domain name. The Facilitator's web site 105 may assist in this process by accepting a desire domain name from the Entrepreneur 101 (Step 201), informing the Entrepreneur 101 if the domain name is available, suggesting alternative available domain names based on input from the Entrepreneur 101, registering a selected available domain name with the appropriate Registry and registering the domain name with the Internet's Domain Name System (DNS) (Step 202).

The Facilitator's web site 105 may assist the Entrepreneur 101 in selecting a domain name by evaluating the quality of one or more available domain names. The Facilitator's web site 105 may evaluate the domain name for length (shorter is generally better) and how difficult it will be for Customers 100 to correctly spell and remember the domain name. Other factors, such as the appropriateness of the domain name for the Entrepreneur's Internet business 107, may also be evaluated based on additional information provided by the Entrepreneur 101. Further details regarding the registration of domain names may be found in patent application Ser. No. 10/408,050 titled METHOD FOR GATHERING DOMAIN NAME REGISTRATION INFORMATION FROM A REGISTRANT VIA A REGISTRAR'S WEB SITE, which is hereby incorporated by reference.

The Facilitator's web site 105 may also warn the Entrepreneur 101 if an otherwise available domain name has already been trademarked and inform the Entrepreneur 101 of the types of goods and services covered by the trademark. The Facilitator's web site 105 may have previously obtained sufficient trademark information to do this analysis and is thus searching its own database or the Facilitator's web site 105 may access an external database, possible the USPTO's database, to check for potential trademark issues. Determining if a conflict exists between an otherwise available domain name and a trademark could help prevent the Entrepreneur 101 from later being sued for trademark infringement for the use of their domain name and will increase the Entrepreneur 101 chance in obtaining a trademark on the domain name by eliminating possible conflicts. After a domain name has been registered, the Facilitator's web site 105 may suggest to the Entrepreneur 101 that the domain name should be trademarked, preferably via the tools offered by the Facilitator's web site 105.

The art of designing and creating web sites on the Internet is well known. Conventional web sites are almost always written in HTML. Early web site designers created their web sites by writing HTML programs one line at a time. This method is still used by many web site designers and allows for highly customized web sites to be created. However, creating a web site by writing each line of HTML code requires considerable programming expertise and a fairly long development time. Higher level programming languages have also been created to simplify the process and shorten the development time for creating web sites.

Recent improvements to web site development techniques allow web sites to be created very quickly using templates. The flexibility in designing a web site using a selected template is reduced, but the ease and simplicity more than make up for its lack of flexibility in many cases. For Example, The Go Daddy Group, Inc™, at www.GoDaddy.Com, offers web site designing tools, such as Web Site Tonight™ and Website Complete,® to be used to design web sites using a template system. Web site designing tools may offer a large number of templates that a web site designer may select from to use for a particular web site. Each template may provide a different layout and appearance for a web site to help the web site display its information in a format most advantageous for that particular web site.

Once a template has been selected, the selected template may be used for most or even all of the web pages in the web site. (Step 300) Basic information may be requested and received from the Entrepreneur 101, or online sources, and used throughout the web site. A common template for most or all of the web site pages gives a web site a uniform appearance and greatly simplifies the web site's design process. Templates may, as nonlimiting examples, provide a uniform appearance and location for one or more of the navigation bars, logos, graphical images, special content as well as provide a uniform color scheme for the web pages within a web site. A consistent look and feel for each web page gives the web site a professional appearance and assists Clients in negotiating their way around the web site. (Step 203)

The web site designing tools may also perform other functions for the web site. For example, the web site designing tools may add meta tags to the web site to allow search engines to properly classify the web site. The web site designing tools may also perform spell checks for web sites and may even have a built-in File Transfer Protocol (FTP) system. In addition, the Facilitator's web site 105 may request information from the Entrepreneur 101 that may be stored for later use. As examples, contact information, billing information, company logos, etc. may be stored for later use so that the Entrepreneur does not have to keep entering this information for each step.

The focus for most Entrepreneurs 101 is to sell their goods and services and then receive payment from the Customer 100. This requires the goods and services to be displayed for the Customer 100, a method for the Customer 100 to select the goods and services they desire to purchase and a method for accepting payment from the Customer 100. While programming these basic electronic commerce features into the Facilitator's web site 105 is certainly possible, it requires a substantial amount of web site design time and expertise.

Entrepreneurs 101 may have Customers 100 send payments through the mail or allow a third party, such as PayPal, to take and process the payments. In a preferred embodiment, the Entrepreneur 101 may purchase access to a store front web site 109 that offers electronic commerce features. These features may include a product catalog, order management system, third party payment integration, shipping integration, customer manager, reporting methods and tax collection methods. If an Entrepreneur 101 wants to accept credit cards on his store front web site 109, the Entrepreneur 101 may purchase a merchant account, and, in order to process non-point-of-sale credit card transactions, interact with a payment gateway, such as Authorize.net, and apply for and receive a secure certificate. The Entrepreneur 101 may purchase these features as a bundled product that includes all of the necessary products to easily incorporate credit card and electronic check processing into their web site 107. All of these may be integrated from the Facilitator's web site 105. If the Entrepreneur 101 already has any of these payment components, the Entrepreneur may be able to use them in place of the Facilitator provided components.

A secure certificate allows the Entrepreneur 101 to exchange encrypted information with Customers 100. The secure certificate greatly reduces the chance a party not involved with the transaction between the Entrepreneur 101 and the Customer 100 will be able to get information about the transaction.

The store front web site 109 may be customized and designed in a manner similar to the design of the Entrepreneur's web site 107. Of particular advantage is to include common templates in the design tools for the Entrepreneur's web site 107 and the design tools for the store front web site 109 so that the same template may be used for both web sites. This allows an Entrepreneur 101 to create an Entrepreneur's web site 107 and a store front web site 109 that have a similar layout and appear to be a single web site from the Customer's perspective. (Step 301) Specifically, the Entrepreneur's web site 107 and the store front web site 109 may share a similar appearance and location for a navigation bar, logos, graphical images, special content (such as textual messages), color scheme and other features. The more of these features that are shared between the Entrepreneur's web site 107 and the store front web site 109, the more the two web sites will appear as a single web site.

A single store front web site 109 may be dedicated to each Entrepreneur's web site 107. However, a much more efficient use of computer resources may be achieved by allowing a single store front web site 109 to handle a plurality of different Entrepreneurs' web sites 107. This may be accomplished by enabling the store front web site 109 to detect which Entrepreneur's web site 107 the Customer 100 came from and then displaying the store front web site 109 using the template and data previously submitted by the Entrepreneur 101 for that Entrepreneur's web site 107. This allows the store front web site 109 to be customized by each Entrepreneur 101 and appear as if it were an integral part for a large number of different Entrepreneurs' web sites. (Step 204) The Facilitator's web site 105 may also use information previously stored regarding the Entrepreneur 101 in designing the store front web site 109. (Step 302)

Known methods, such as hyperlinks, may be used to allow Customers to easily move back and forth between the web pages in the Entrepreneur's web site 107 and the web pages in the store front web site 109 thereby creating a virtual web site. Menu tabs, lists, links or other methods may also be used to assist Customers 100 in moving between the two web sites. (Step 303) The appearance of a single virtual web site promotes confidence in the Customer 100 that they are purchasing goods and services from the Entrepreneur 101 and presents a professional appearance to the Customer 100.

Hosting services 110 may also be offered to the Entrepreneur 101 for the Entrepreneur's web site 107 on the Facilitator's web site 105. (Step 205) The Facilitator's web site 105 may ask questions of the Entrepreneur 101 in an attempt to determine a recommended level of hosting services. The recommendations may include suggestions regarding the amount of disk space, bandwidth, email accounts and database capabilities that will be provided for the Entrepreneur's web site 107. The Facilitator's web site 105 may compare past web sites that are similar to the Entrepreneur's web site 107 in determining and recommending a level of hosting services for the Entrepreneur's web site 107. The resources provided by the hosting service 110 may be updated from time to time as the volume of the Entrepreneur's Internet business fluctuates. In a preferred embodiment, the resources are automatically updated to match the needs of the Entrepreneur's web site 107, but an email message or other method of contacting the Entrepreneur 101 may also be used to let the Entrepreneur 101 know that a change in the allocated hosting service's resources is recommended. Hosting the Entrepreneur's web site 107 effectively publishes the web site 107 and puts the domain name in commercial use.

The Facilitator's web site 105 may also be used to assist the Entrepreneur 101 in copyrighting all or some portion of the material comprising the Entrepreneur's web site 107 with the United States Copyright Office 108. (Step 206) Information necessary to complete a copyright application may be requested and received either from the Entrepreneur 101, from available on-line databases or from information previously received from the Entrepreneur 101 and saved. (Step 400) The copyright application information will typically include the title of the work (the domain name may be used as the default title), number of authors, names of authors, i.e. the designers of the Entrepreneur's web site 107, whether the work made for hire, date of the author(s)' birth, authors' nationality or domicile, creation date, publication date, name and address of a claimant if there is one, nature of transfer if there is a claimant, nature of previous copyright registrations if any, nature of the work, i.e. whether it is a new work, derivation or compilation, name and contact information for a correspondent, certification from the author(s), address for return of the certificate and method of payment for the copyright fee.

The Facilitator's web site 105 may also obtain the content of the Entrepreneur's web site 107 so that the material may be submitted to the USCO 108 as part of the copyright process. (Step 401) The Facilitator's web site 105 may obtain the material to be copyrighted using several different methods. For example, the Entrepreneur 101 may directly provide a file to the Facilitator's web site 105. The file may be in the correct format or the Facilitator's web site 105 may have to translate the file into a format acceptable by the USCO. (Step 402) In another embodiment, the Entrepreneur 101 may provide a URL or domain name for the Entrepreneur's web site 107 and the Facilitator's web site 105 may access the Facilitator's web site 105 over the Internet to obtain a copy of the material to be copyrighted.

The Facilitator's web site 105 may create a copyright application by combining the Entrepreneur's copyright application information and a copy of Entrepreneur's web site 107 in a format suitable for submission to the USCO. (Step 403) The Entrepreneur 101 may be given an option of allowing the Facilitator's web site 105 to electronically submit the copyright application to the USCO (Step 405) or to receive a copy of the copyright application (either via traditional mail or by electronic mail) (Step 406) and then allowing the Entrepreneur 101 to file the signed copyright application directly with the United States Copyright Office (Step 407).

In a preferred embodiment, the label (the domain name minus the top-level domain) portion of their domain name and the domain name for the Entrepreneur's web site 107 may be trademarked with the USPTO. (Step 207) The label and the domain name may be trademarked by the Facilitator's web site 105 at any time during the creation of the Entrepreneur's Internet business. However, there are advantages in waiting until after the domain name has been registered and the Entrepreneur's web site 107 has been hosted, thereby placing the domain name in interstate commerce. Once the domain name has been used in interstate commerce, a Use in Commerce (Section 1(a)) trademark application may be filed. Trademarking the domain name prior to hosting, assuming the domain name has not been used in commerce using another method, requires an Intent to Use (Section 1(b)) trademark application to be filed. A Section 1(b) application requires a Statement of Use and a corresponding fee to be filed at a later date, thereby making the Section 1(b) process more complicated and expensive.

Several different methods may be used by the Facilitator's web site 105 in assisting the Entrepreneur 101 in filing a trademark application for the domain name or the label with the USPTO 106. In a very streamlined embodiment specifically illustrated in FIG. 5*a*, the Entrepreneur 101 may be given general guidance and instructions (Step 501) as to filing a trademark application and then provided a link from the Facilitator's web site 105 to the USPTO's web site 106 (Step 500). Once linked to the USPTO's web site 106, the Entrepreneur may follow the USPTO's instructions for filing a trademark application on the label and domain name. After trademarking their domain name, the Entrepreneur 101 may return to the Facilitator's web site 105 to complete other steps in completing their Internet business.

Figure 5A:
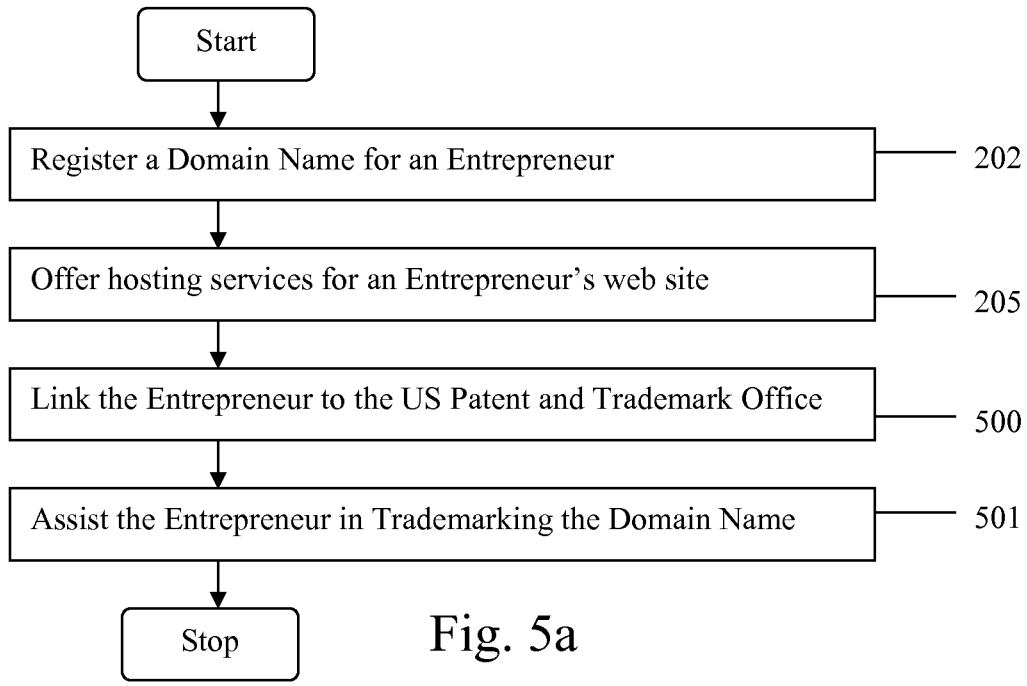
FIG. 5a is a flow chart illustrating an embodiment of the invention for registering a domain name with a Registry and trademarking the domain name with the USPTO.
Figure 5B:
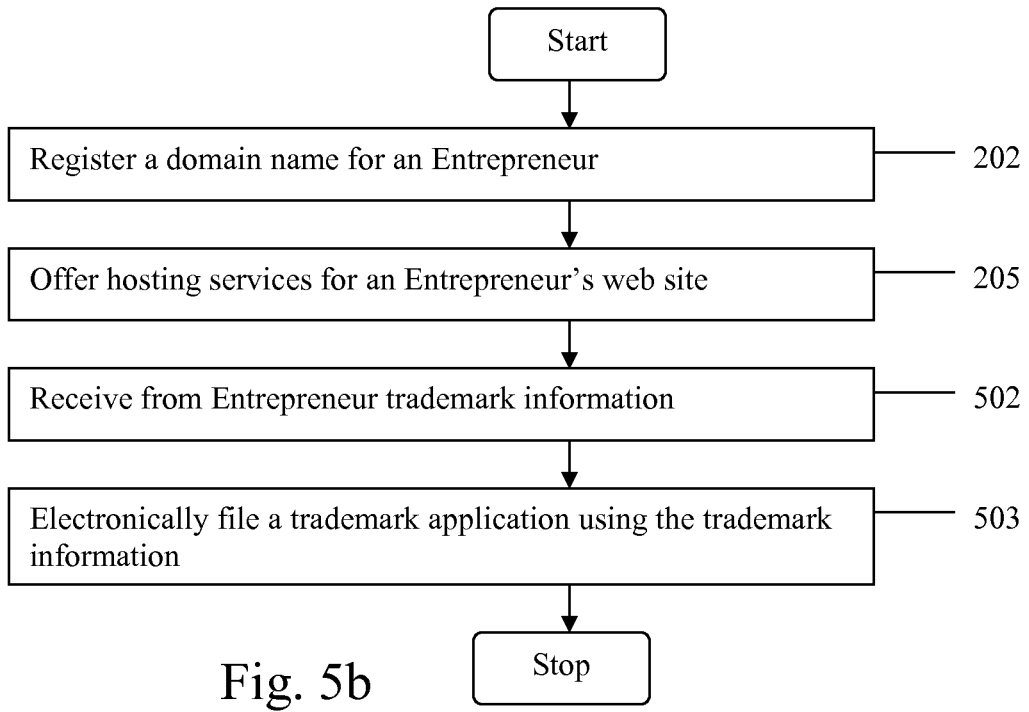
FIG. 5b is a flow chart illustrating another embodiment of the invention for registering a domain name with a Registry and trademarking the domain name with the USPTO.
Figure 5C:
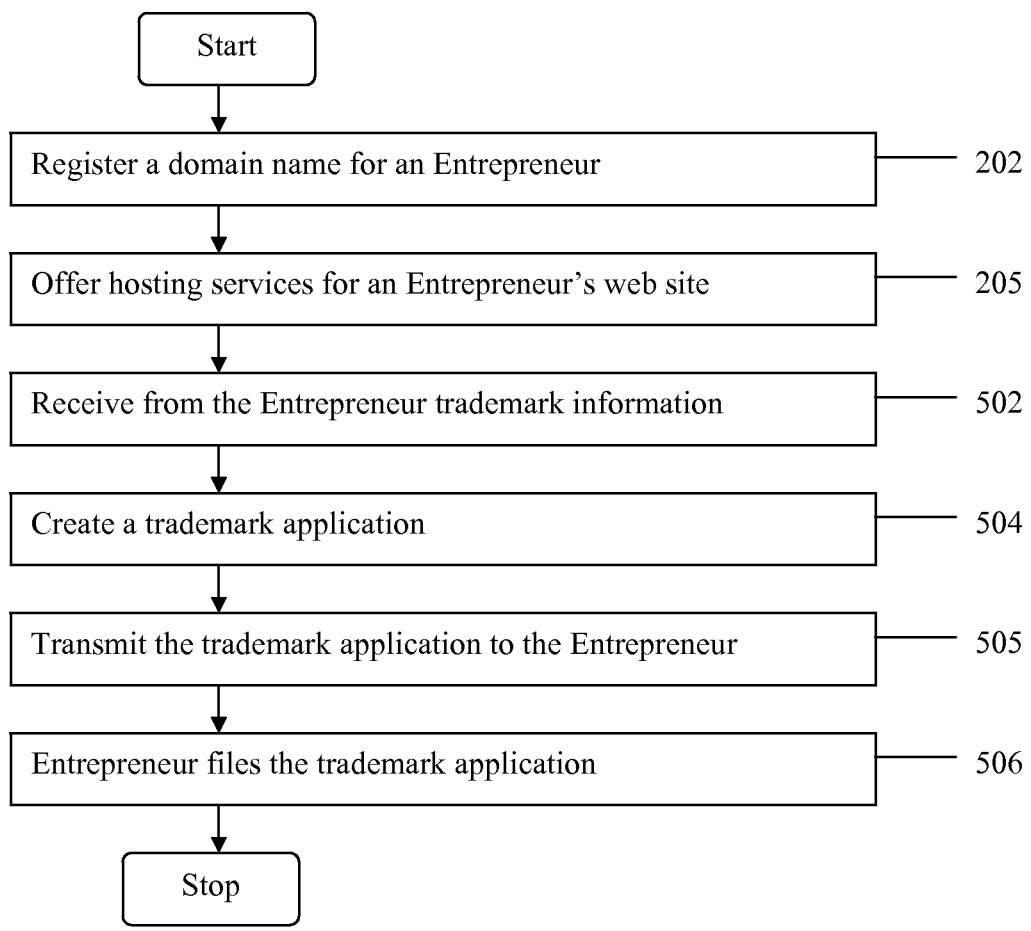
FIG. 5c is a flow chart illustrating another embodiment of the invention for registering a domain name with a Registry and trademarking the domain name with the USPTO.

FIGS. 5*b-c* illustrate two other methods for the Facilitator's web site 105 to assist the Entrepreneur 101 trademarking their domain name. The Facilitator's web site 105 may request and receive trademark information from the Entrepreneur 101 that is necessary to file a trademark application. (Step 502) The types of information necessary to file a trademark application are well known and publicly available on the USPTO's web site at www.uspto.gov. Once the Facilitator's web site 105 has the information, it may have a person manually enter the trademark information into the USPTO's web site's online features. If the USPTO adds the capability for a direct web site to web site communication in the future, such as via an Application Program Interface (API), the trademark information may be automatically downloaded to the USPTO without human intervention. (Step 503)

Another embodiment of the invention is for the Facilitator's web site 105 to use the trademark information to create a trademark application. (Step 504) The trademark application may be emailed to the Entrepreneur 101. (Step 505) The Entrepreneur 101 may then electronically sign the trademark application and email the trademark application to the USPTO. (Step 506) Regardless of the trademark submission process, the trademark confirmation notice from the USPTO may be transmitted, for example by mail or email, to the Entrepreneur 101 for their records.

The Facilitator's web site 105 may be used to increase traffic flow to the Entrepreneur's web site 107 by analyzing, optimizing and submitting the Entrepreneur's web site 107 to one or more search engines 104. The Facilitator's web site 105 may accept search phrases and check the compatibility of the Entrepreneur's web site 107 with the search phrases as well as check the textual content, parseability and spiderability of the Entrepreneur's web site 107. In a preferred embodiment, the analysis mimics or uses similar ranking methodologies used by the search engines 104. The Facilitator's web site 105 may then communicate suggested changes to the Entrepreneur 101 to be manually made or automatically change the Entrepreneur's web site code so that the Entrepreneur's web site 107 will be properly categorized and highly prioritized by search engines 104. The Facilitator's web site 105 may then submit the Entrepreneur's web site 107 and the store front web site 109, including submitting individual web pages, to one or more search engines 104.

The search engine 104 submission process may be accomplished by the Facilitator's web site 105, for example, using products similar to the product known as Traffic Blazer™ available from The Go Daddy Group, Inc.™ at the web site of www.Godaddy.Com. (Step 208) Further details regarding the submission of web sites to search engines 104 may be found in patent application Ser. No. 10/662,998 titled METHOD FOR IMPROVING A WEB SITE'S RANKING WITH SEARCH ENGINES, which is hereby incorporated by reference.

Customers 100 who purchase products from the Entrepreneur's store front web site 109 may request to be sent sales and marketing information via email. The Entrepreneur 101 may use the Facilitator's web site 105 to compile a list of Customers 100 for this purpose. The Entrepreneur 101 may then use complementary templates to construct the sales and marketing information that is sent to the Customers 100. The complementary templates for the sales and marketing information in the email may include a similar color schemes, logo, etc. to the templates used in creating the Entrepreneur's web site 107 and store front web site 109. The email containing the information may contain one or more embedded hyperlinks back to the Entrepreneurs' web sites 107 or the store front web site 109. This enables Customers to transition seamlessly from the email to the Entrepreneur's web site 107 or the store front web site 109.

Performing various subcombinations of the above described steps on a Facilitator's web site offer many advantages to Entrepreneurs 101. Such advantages include enabling Entrepreneurs 101 to perform a variety of different and complicated steps all from a single web site to create their Internet business. This greatly simplifies the process and reduces the amount of time necessary to get the Entrepreneurs' Internet business online and running. A single Facilitator's Web site 105 also allows for a greater integration of steps than is possible in prior art methods of spreading the various Internet development tools over a plurality of web sites. A single web site also allows Entrepreneurs to access desired information all from a single web site. In addition, Entrepreneurs only have to be enter information and single time and then the information may be saved and used for later steps, greatly simplifying the otherwise burdensome task of entering data.

In view of the foregoing, it will be understood by those skilled in the art that the systems and processes of the present invention can facilitate the creation of an Internet business for an Entrepreneur. The above-described embodiments have been provided by way of example, and the present invention is not limited to these examples. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

What is claimed is:

1. A method, comprising the steps of:
   a) creating a domain name registering entity's web site on the Internet offering domain name registration services, web site hosting services, and web site design services;
   b) the domain name registering entity's web site receiving a request from a registrant to register a domain name having a label and a top-level domain name;
   c) determining an availability of the domain name;
   d) if the domain name is available, registering the domain name to the registrant;
   e) the domain name registering entity's web site receiving a request from the registrant to host a registrant's web site;
   f) hosting the registrant's web site at an IP address associated with the domain name;
   g) the domain name registering entity's web site receiving a request from the registrant to design the registrant's web site; and
   h) designing the registrant's web site.

2. The method of claim 1, further comprising the step of:
   i) the domain name registering entity's web site assisting the registrant in copyrighting at least some of the content of the registrant's web site with the United States Copyright Office.

3. The method of claim 1, further comprising the step of:
   i) the domain name registering entity's web site assisting the registrant in trademarking the domain name or the label with the United States Patent and Trademark Office.

4. The method of claim 1, further comprising the step of:
   i) the domain name registering entity's web site assisting the registrant in selecting hosting options appropriate for an anticipated business volume of the registrant's web site.

5. The method of claim 1, further comprising the step of:
   i) the domain name registering entity's web site submitting the registrant's web site to one or more search engines.

6. A method, comprising the steps of:
   a) creating a domain name registering entity's web site on the Internet offering domain name registration services, web site hosting services, trademark services and copyright services;

b) the domain name registering entity's web site receiving a request from a registrant to register a domain name having a label and a top-level domain name;
c) determining an availability of the domain name;
d) if the domain name is available, registering the domain name to the registrant;
e) the domain name registering entity's web site receiving a request from the registrant to host a registrant's web site;
f) hosting the registrant's web site at an IP address associated with the domain name;
g) the domain name registering entity's web site receiving a request from the registrant to trademark the domain name or the label with the United States Patent and Trademark Office;
h) trademarking the domain name or the label;
i) the domain name registering entity's web site receiving a request from the registrant to copyright at least some of the content of the registrant's web site; and
j) copyrighting at least some of the content of the registrant's web site with the United States Copyright Office.

7. The method of claim 6, wherein step h) includes the step of:
   i) linking the registrant with the official web site for the United States Patent and Trademark Office from the domain name registering entity's web site.

8. The method of claim 6, wherein step h) includes the steps of:
   i) receiving trademark information from the registrant;
   ii) creating hardcopy trademark forms containing the trademark information;
   iii) transmitting the hardcopy trademark forms to the registrant; and
   iv) instructing the registrant in the procedure for submitting the hardcopy trademark forms to the United States Patent and Trademark Office.

9. The method of claim 6, wherein step h) includes the steps of:
   i) receiving trademark information from the registrant;
   ii) creating electronic trademark forms containing the trademark information; and
   iii) electronically submitting the electronic trademark forms to the United States Patent and Trademark Office on behalf of the registrant.

10. The method of claim 6, wherein step j) includes the step of:
    i) linking the registrant with the official web site for the United States Copyright Office from the domain name registering entity's web site.

11. The method of claim 6, wherein step j) includes the steps of:
    i) receiving copyright information from the registrant;
    ii) creating hardcopy copyright forms containing the copyright information;
    iii) transmitting the hardcopy copyright forms to the registrant; and
    iv) instructing the registrant in the procedure for submitting the hardcopy trademark forms to the United States Copyright Office.

12. The method of claim 6, wherein step j) includes the steps of:
    i) receiving copyright information from the registrant;
    ii) creating electronic copyright forms containing the copyright information; and
    iii) electronically submitting the copyright forms to the United States Copyright Office.

13. A method, comprising the steps of:
    a) creating a domain name registering entity's web site on the Internet offering domain name registration services, web site hosting services, and web site design services;
    b) the domain name registering entity's web site receiving a request from a registrant to register a domain name having a label and a top-level domain name;
    c) determining an availability of the domain name;
    d) if the domain name is available, registering the domain name to the registrant;
    e) the domain name registering entity's web site receiving a request from the registrant to host a registrant's web site;
    f) hosting the registrant's web site at an IP address associated with the domain name;
    g) the domain name registering entity's web site receiving a request from the registrant to design the registrant's web site;
    h) designing the registrant's web site, wherein the registrant's web site includes a first logo, first graphical image or first color scheme;
    i) the domain name registering entity's web site receiving a request from the registrant to design a store front website; and
    j) designing the store front website, wherein the registrant's web site includes a second logo, second graphical image or second color scheme and wherein at least one of the second logo, second graphical image or second color scheme has the same position or appearance as the first logo, first graphical image or first color scheme in the registrant's web site.

14. The method of claim 13, further comprising the step of:
    k) the domain name registering entity's web site assisting the registrant in copyrighting at least some of the content of the registrant's web site with the United States Copyright Office.

15. The method of claim 13, further comprising the step of:
    k) the domain name registering entity's web site assisting the registrant in trademarking the domain name or the label with the United States Patent and Trademark Office.

16. The method of claim 13, further comprising the step of:
    k) the domain name registering entity's web site assisting the registrant in selecting hosting options appropriate for an anticipated business volume of the registrant's web site.

17. The method of claim 13, further comprising the step of:
    k) the domain name registering entity's web site submitting the registrant's web site to one or more search engines.

* * * * *